United States Patent [19]

Schriefer

[11] Patent Number: 5,395,189
[45] Date of Patent: Mar. 7, 1995

[54] METHOD FOR THE PRECISION WORKING OF CROWNED AND/OR CONICAL TOOTH SYSTEMS

[75] Inventor: Herbert Schriefer, Gauting, Germany

[73] Assignee: HURTH Maschinen und Werkzeuge G.m.b.H., Munich, Germany

[21] Appl. No.: 56,368

[22] Filed: Apr. 30, 1993

[30] Foreign Application Priority Data

May 5, 1992 [DE] Germany ............... 42 14 851.0

[51] Int. Cl.$^6$ ............................. B23F 19/06
[52] U.S. Cl. ........................... 409/32; 451/47
[58] Field of Search ............ 409/31, 32, 33, 42; 51/287

[56] References Cited

U.S. PATENT DOCUMENTS

| | | | |
|---|---|---|---|
| 2,228,967 | 1/1941 | Miller | 409/32 |
| 2,228,968 | 1/1941 | Miller | 409/31 |
| 2,280,045 | 4/1942 | Miller . | |
| 2,343,567 | 3/1944 | Miller | 409/32 |
| 2,762,268 | 9/1956 | Maurer | 409/32 |
| 4,545,708 | 10/1985 | Buschhoff et al. | 409/49 |
| 4,950,112 | 8/1990 | Huber | 409/32 |

FOREIGN PATENT DOCUMENTS

| | | |
|---|---|---|
| 1147460 | 4/1963 | Germany . |
| 8805237.0 | 6/1988 | Germany . |
| 1535355 | 12/1978 | United Kingdom . |

*Primary Examiner*—Daniel W. Howell
*Attorney, Agent, or Firm*—Flynn, Thiel, Boutell & Tanis

[57] ABSTRACT

A shaving cutter, honing cutter or the like serving as a tool (T) matingly meshing at a crossed-axes angle ($\delta$) with the toothed workpiece (W) during a precision working of crowned and/or conical tooth systems guided during a feed movement (V) at an angle ($\epsilon$) inclined with respect to the workpiece axis and along same. The feed movement (V) is thereby superposed by an additional movement directed perpendicularly thereto and these two movements are coordinated in such a manner with one another that the working zones of the tool (T) are guided on a curve (55) which lies on a theoretical envelope (50) of the workpiece (W) defining the crown dimensions from one face of the workpiece (W) to the other. The working zones of the tool (T) have thereby at each contact point (K) a tangential contact with the workpiece tooth flanks (2, 3) to be machined. A tilting of the tool (T) or of the workpiece (W) about an axis extending transversely with respect to its axis (30, 31) is not necessary and, accordingly, the machine does not have any corresponding devices.

3 Claims, 5 Drawing Sheets

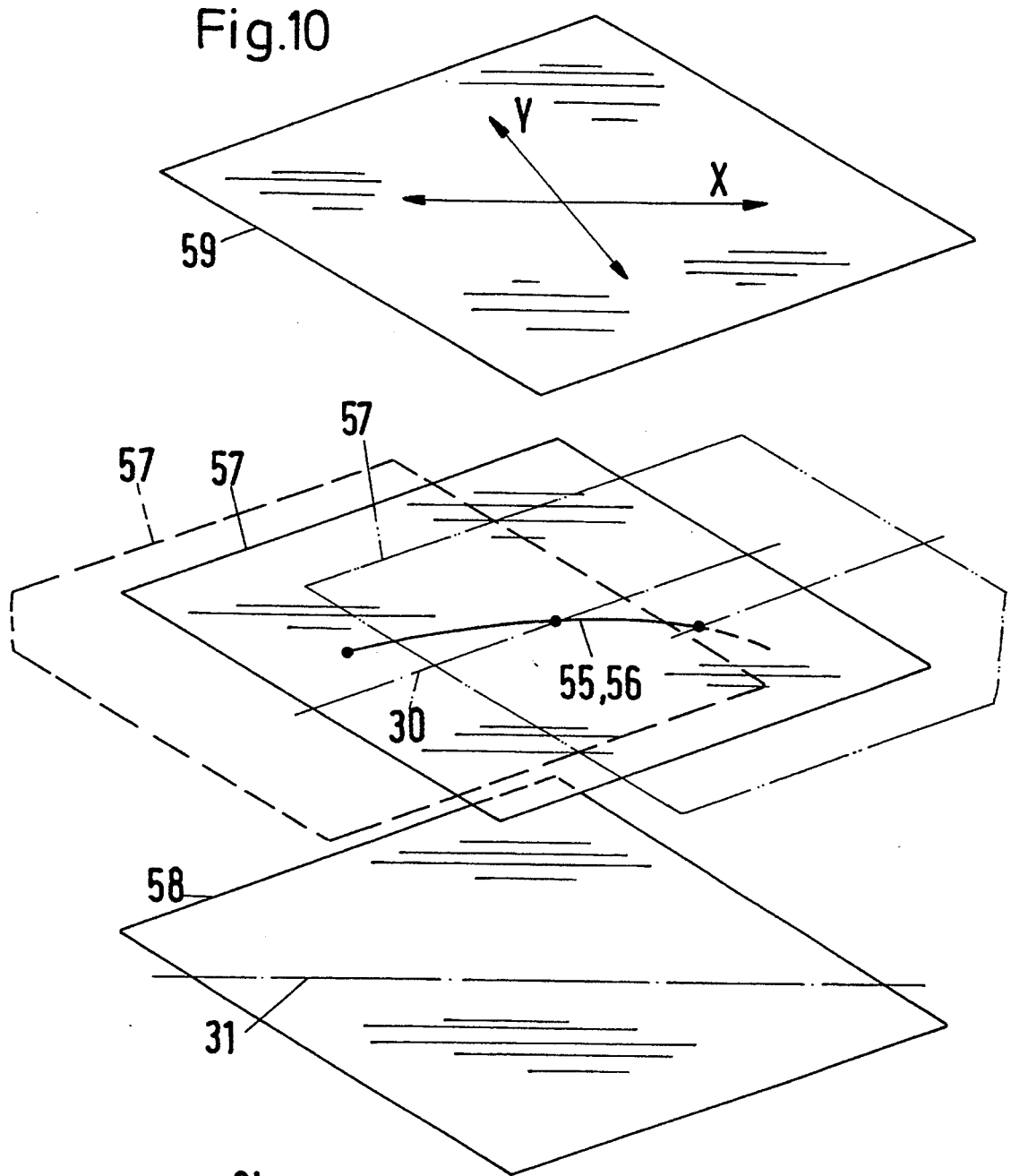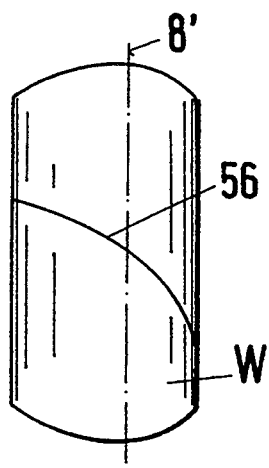

METHOD FOR THE PRECISION WORKING OF CROWNED AND/OR CONICAL TOOTH SYSTEMS

FIELD OF THE INVENTION

The invention relates to a method for the precision working of crowned and/or conical tooth flanks on gears.

BACKGROUND OF THE INVENTION

Such a method or for carrying out the method a machine is known from EP 0 360 953 A2 (corresponds to U.S. Pat. No. 4 950 112). There a gear-shaped tool is rotatably driveably received in a tool head adjustably rotationally guided about an adjustment axis extending perpendicularly with respect to an axis of rotation of a tool and with respect to a workpiece axis in a cradle pivotal about a horizontal axis on a feed carriage movable in a horizontal direction. The two directions of movement are angularly offset from one another at 90°. The feed carriage is guided on a plunge-feed carriage movable in a vertical direction.

A machine, which is similar regarding the carriage movements, is known from DE-Gbm 88 05 237.0. To produce the crowned and/or conical tooth flanks on the workpiece tooth system, the tool of this machine is, however, not pivoted, but the machine table carrying the workpiece carries out a pivoting movement about a swivel axis extending transversely with respect to the workpiece axis.

Both known machines have in common that, without the rotational and pure adjustment axes, four machine axes exist, the movements of which are controlled by the machine control system which must be first suitably programmed. The more axes that need to be controlled on a machine tool, the greater is the amount of programming work and the greater is also the risk of desired-value deviations on the machined workpiece. Also the likelihood of so-called repeat precision becomes less the more axes are to be controlled. This is particularly true in the case of gear working machines where feed movements in the order of magnitude of only a few $\mu m$ is nothing extraordinary.

Starting out from this problematic basis, the basic purpose of the invention is to develop a method and a machine suitable to carry out this method which enables the precision working of crowned and/or conical tooth surfaces with less than four machine axes which must be controlled.

SUMMARY OF THE INVENTION

The objects and purposes of the invention are met by providing a method for a precision working of crowned and/or conical tooth flanks on toothed workpieces utilizing a gear-shaped tool having geometrically defined cutting edges or an abrasive surface on its tooth flanks, and which matingly meshes with the workpiece with axes of tool and workpiece, which axes have a center distance spacing therebetween and are crossed at a crossed-axes angle and carries out thereby a feed movement directed at an angle inclined with respect to the workpiece axis and a plunge-feed movement directed perpendicularly thereto in the sense of a reduction of the center distance. The feed movement is superposed continuously by an additional movement directed perpendicularly thereto and these two movements are adjusted in such a manner to one another that the working zones of the tool are guided on a curve from one face of the workpiece to the other. The working zones of the tool are at each contact point in a tangential contact with the workpiece tooth flanks to be produced.

The method disclosed herein can be used for the precision working of not only externally toothed workpieces, but also advantageously for internally toothed workpieces. The invention is also not to be limited to the use of an externally toothed tool, but can be designed just as advantageously with internally toothed tools.

BRIEF DESCRIPTION OF THE DRAWINGS

The invention will be described hereinafter in connection with one exemplary embodiment illustrated in the drawings, in which:

FIG. 9 is a view of a peripheral edge of a different toothed workpiece, FIG. 10 illustrates the position of the axes of tool and workpiece in the positions of the tool illustrated in FIGS. 7 and 8, and FIGS. 11 and 12 are two views showing the sequence of movement between an internally toothed tool and the workpiece.

DETAILED DESCRIPTION

Figure 1:
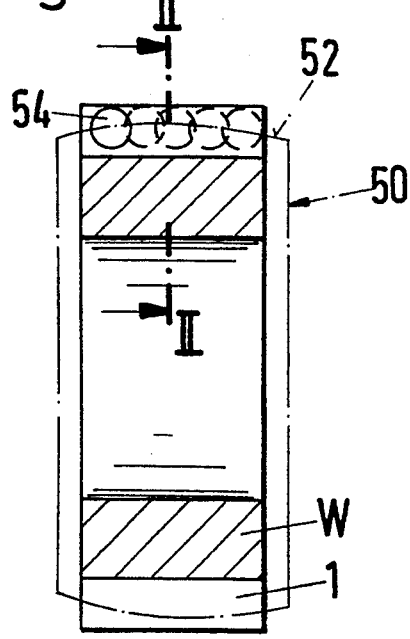
FIG. 1 is a longitudinal cross-sectional view of a toothed workpiece having a crowned tooth system.
Figure 3:
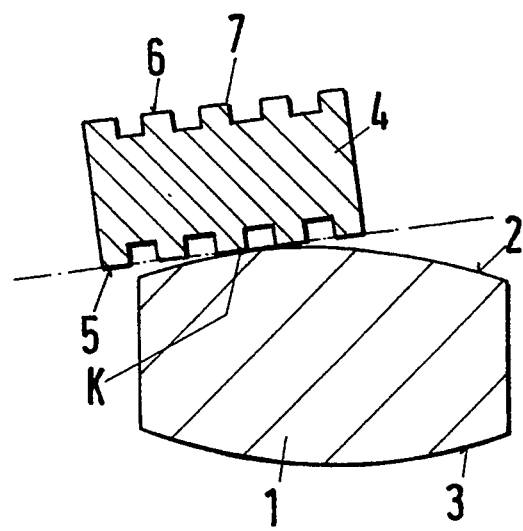
FIG. 3 illustrates the cooperation of a tool tooth with a workpiece tooth at one contact point.

A toothed gear or rather a toothed workpiece W illustrated in a longitudinal cross-sectional view in FIG. 1 has teeth 1, the tooth flanks 2, 3 of which are longitudinally crowned as this is shown in FIG. 3. (The illustrations are slightly simplified and are much exaggerated in parts, in particular in the case of the crown dimensions for the purpose of providing a greater clarity.) A gear-like tool T is provided for the precision working of the tooth flanks 2, 3, which tool T can be a shaving cutter with cutting edges 7 geometrically defined on its tooth flanks 5, 6 or a honing cutter with an abrasive surface on its tooth flanks, a hard-shaving cutter or the like. In order to produce a satisfactory surface on the flanks of the teeth of the workpiece, it is necessary that the working zones on the tooth flanks 5, 6 of the tool T rest at each contact point K tangentially on the tooth flanks 2, 3 of the workpiece W (FIG. 3).

Figure 6:
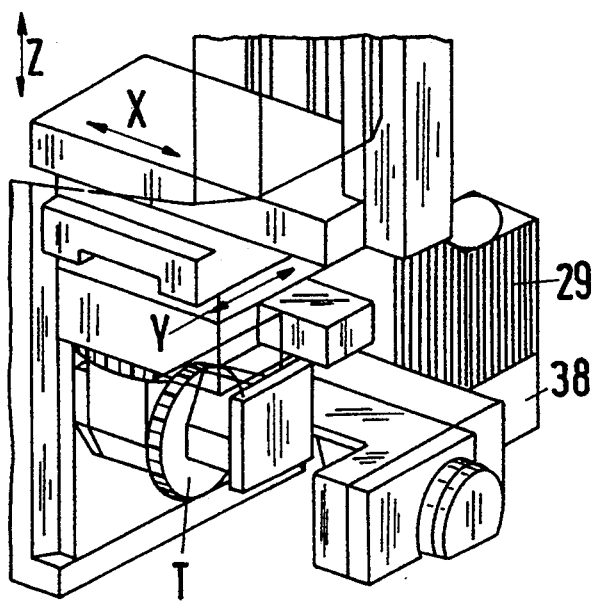
FIG. 6 is a perspective view of an important part of the machine.
Figure 4:
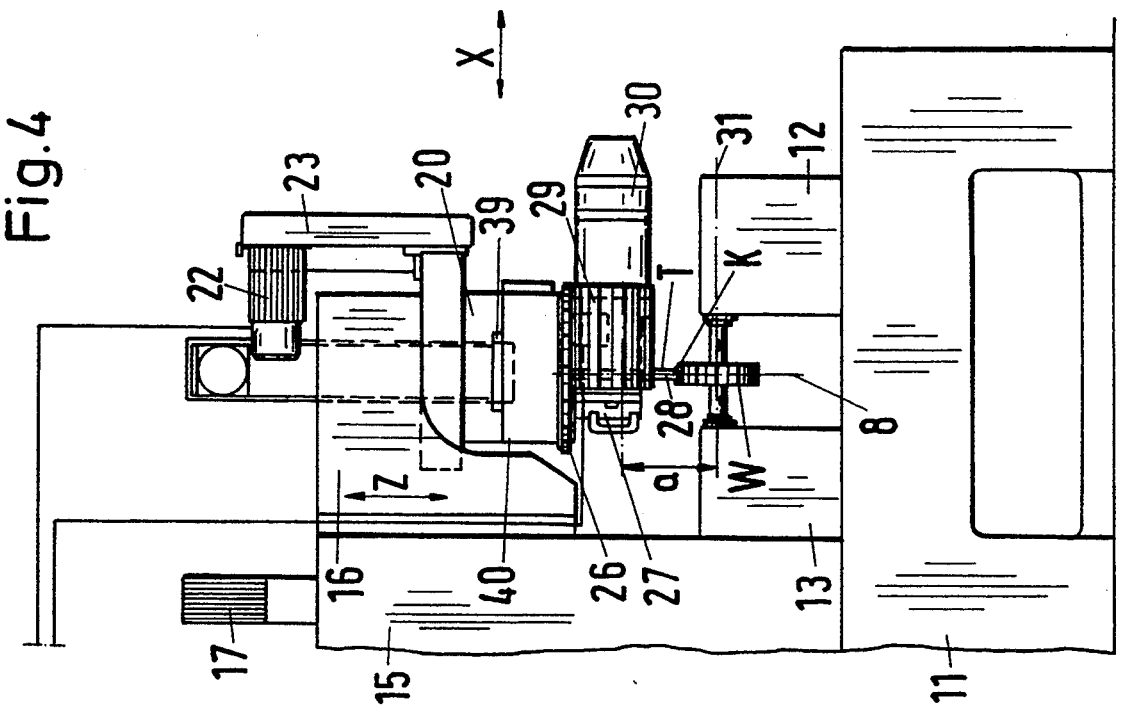
FIG. 4 is a side view of the machine embodying the invention.
Figure 5:
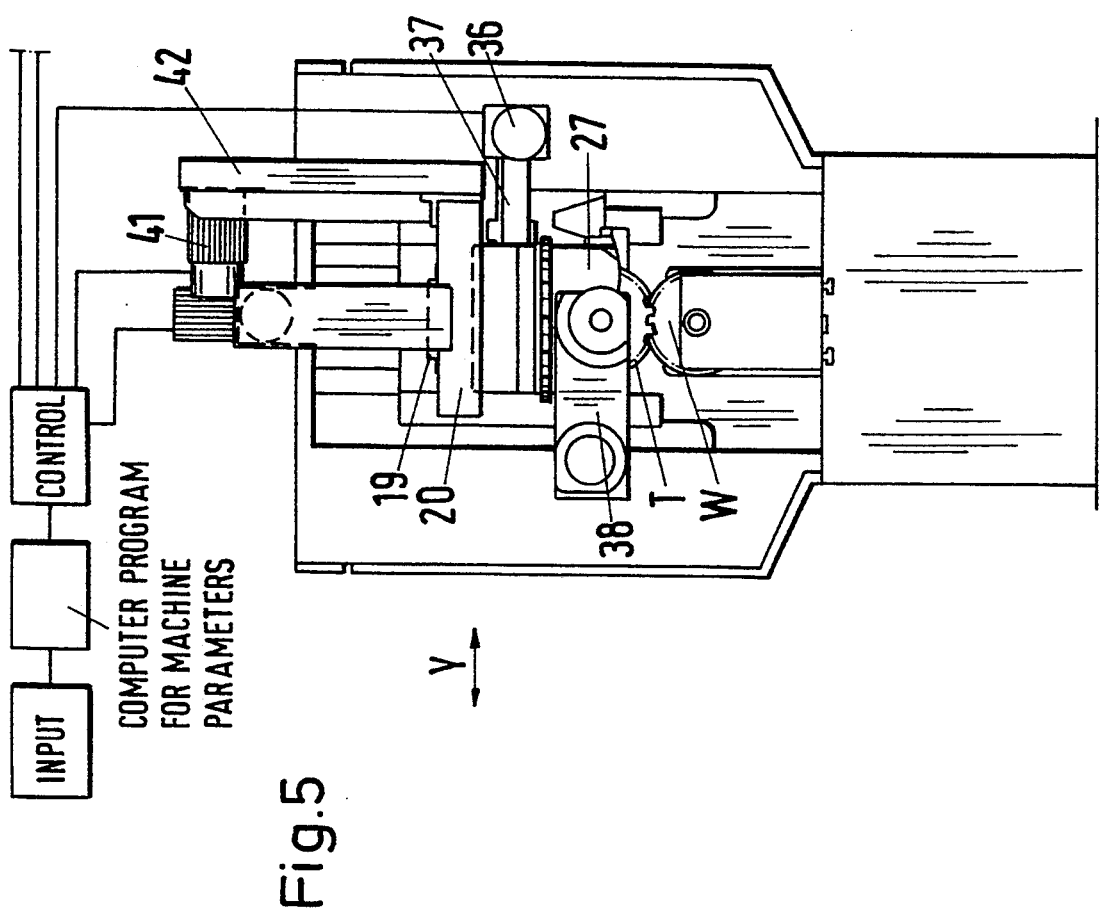
FIG. 5 is a front view of the machine in arrow direction II according to FIG. 4.
Figure 7:
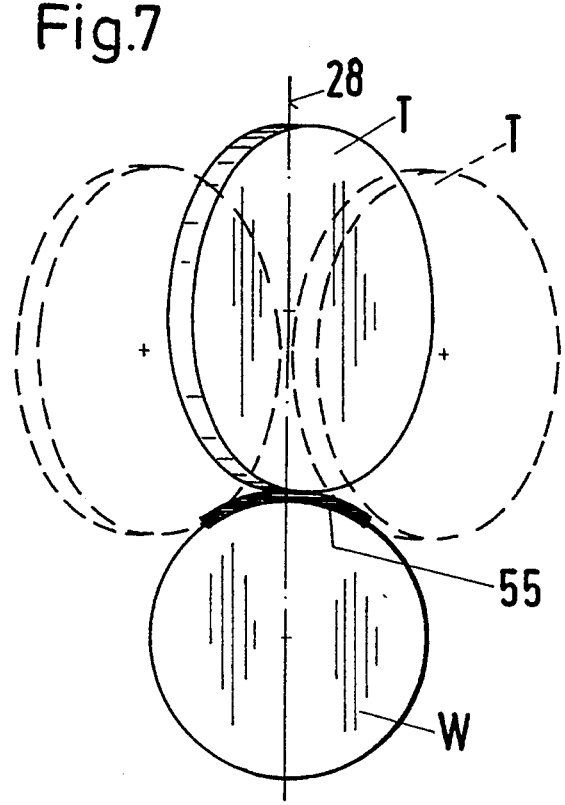
FIGS. 7 and 8 are two views showing the sequence of movement between the tool and the workpiece.

A machine for the precision working of the crowned tooth flanks 2, 3 of the workpiece W is illustrated in three different views in FIGS. 4 to 6. The toothed workpiece W is rotatably received between tailstocks 12, 13 on a bed 11 of the machine and is to be machined by shaving, honing or a similar method. A plunge-feed carriage 16 is vertically movable (arrow direction Z) on a column 15 and can be driven by a motor 17 and a spindle drive (not illustrated). A feed carriage 20 is supported for movement back and forth (arrow direction X) parallel with respect to the workpiece axis 31 in a longitudinal guideway 19, for which purpose a motor 22 with a transmission 23 is provided.

A transverse carriage 40 is supported for movement back and forth (arrow direction Y) in a second longitudinal guideway 39 on the feed carriage 20, the second longitudinal guideway 39 being angularly offset at 90° with respect to the longitudinal guideway 19. A motor 41 and an operatively connected transmission 42 is provided for this purpose.

A tool head 27 is rotationally adjustably supported for movement about a vertical axis 28 in a rotary clamping mechanism 26 on the underside of the transverse carriage 40. The gear-shaped tool T is supported in the tool head 27, which tool T can be driven by a motor 29 through an appropriate transmission 38. The axis of rotation 28 of the tool head 27 lies at the start of each machining operation, in the case of workpieces having symmetrical crown dimensions, preferably, however, not necessarily, in the middle rotational plane 8 of the tool T or rather, in the case of workpieces having asymmetrical crown dimensions (compare FIG. 9), in the rotational plane 8' defined by the vertex of the crown dimension.

Figure 2:
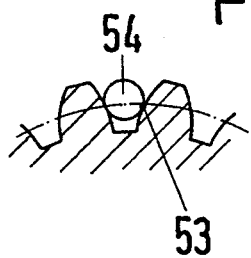
FIG. 2 is a cross-sectional view of the tooth system of the toothed workpiece taken along the line 2—2 of FIG. 1.

By rotating the tool head 27 about the axis 28, for which purpose a motor 36 and an appropriate transmission 37 are provided, a crossed-axes angle δ between the axis 30 of the tool T and the workpiece axis 31 is adjusted. The axes 30, 31 lie thereby in parallel planes 57, 58, which will be discussed below. By suitably synchronizing the movement in the X direction of the feed carriage 20 and the movement of the transverse carriage 40 in the Y direction, the feed direction V (FIG. 8) of the tool T is adjusted, which feed direction is inclined at a feed angle ε with respect to the image plane of FIGS. 1, 2.

The method of the invention is carried out as follows: The tool T meshes in a conventional manner with the workpiece W, namely, at one flank contact point or two flank contact points. The tool T, starting from the above-mentioned position, then carries out, also in a conventional manner, at least one back and forth movement in the feed direction V, with as a rule at least a one time feed movement in the sense of a reduction of the center distance "a" being necessary. To produce crowned tooth flanks, the feed movement in the direction V, which feed movement is composed of the movement components in the X and in the Y directions, is constantly superposed by a positive and negative additional movement in the arrow direction Z, which additional movement is directed perpendicularly with respect to the feed movement in the direction V such that the working zones on the tool T leading from one face of the workpiece to the other lie at each contact point K always on a theoretical outer surface 51 of a theoretical envelope 50 and in such a manner that between the tooth flanks 5, 6 of the tool T and the tooth flanks 2, 3 of the workpiece W there always exists a tangential contact. This additional movement is independent from the plunge-feed movement and may not be confused with same.

The theoretical outer surface 51 of the theoretical envelope 50 is defined by a surface representing line 52 which includes all contact points 53 on one tooth flank of a ball 54 guided for lateral movement through a tooth gap on the workpiece W and contacting both sides of the tooth gap. If one now permits the line 52 to rotate about the axis 31 of the workpiece, one obtains the aforesaid theoretical outer surface 51 and the radial extent for the envelope 50. When the workpiece W is supposed to have crowned flank sections only in the area of the tooth ends, then the additional movement in the uncrowned section lying therebetween is not performed.

Figure 8:
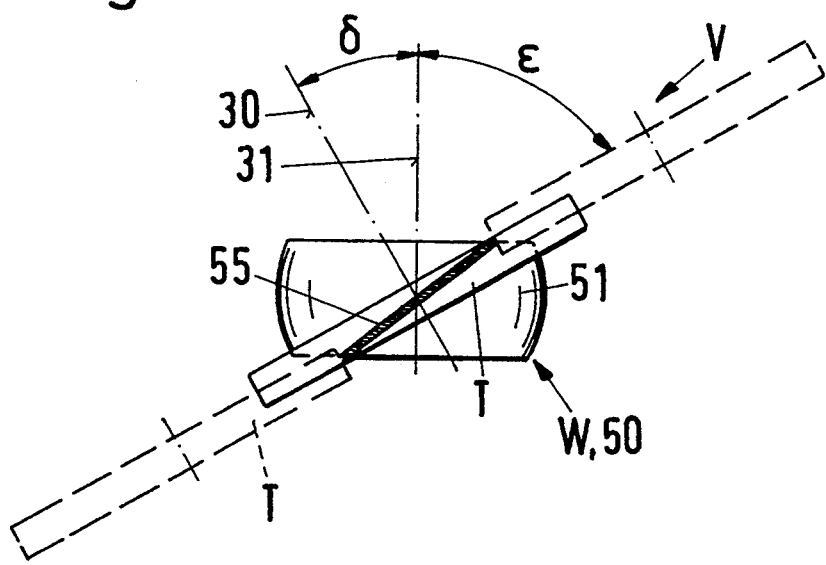
Figure 11:
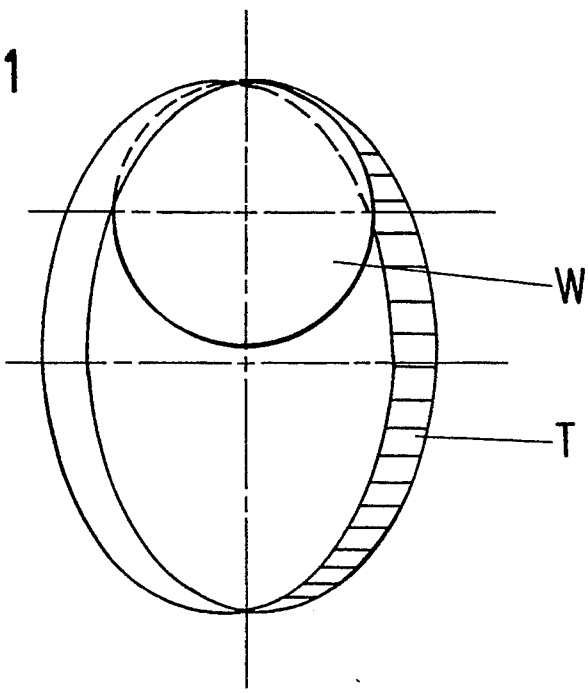
Figure 12:
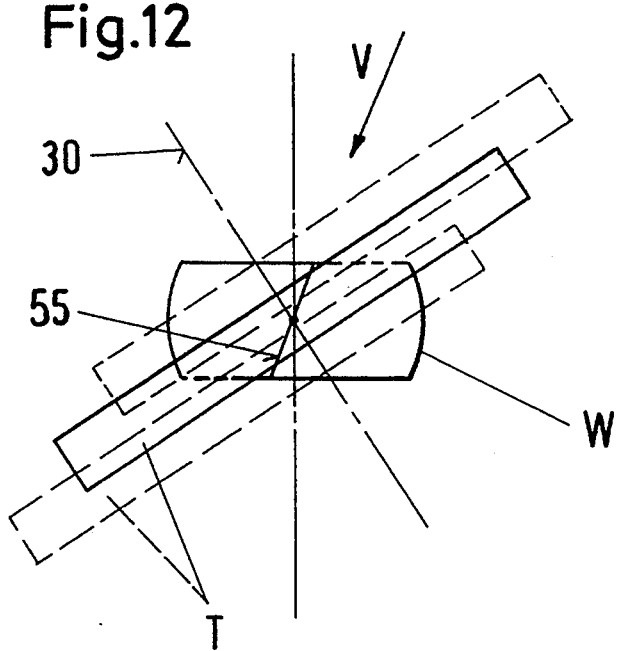

When the workpiece W is supposed to have a symmetrical crown dimension, as this is shown in FIGS. 1 and 8, then the contact points K move on a flat curve 55 which, viewed in the Z direction, appears as a straight line (FIG. 8). Whereas when the workpiece W receives an asymmetrical crown dimension, as it is shown in FIG. 9 only as an example, then the contact points K move on a three-dimensional curve 56.

Independent from the course and the shape of the curve 55, 56, the tool axis 30 and the workpiece axis 31 lie in each position of the contact point in planes 57, 58 which are parallel to one another and to a plane 59 defined by the axes X and Y (FIG. 10), with the plane 58 containing the workpiece axis 31 which does not change its position, namely, in particular does not carry out any rotation about the axis 31.

The various movements carried out by the tool T can take place independently from one another, their reciprocal dependency is effected only by a suitable programming of the machine control. Thus practically any desired corrections in the flank line can be extensively realized. Care must only be taken that the tool T is always guided along on the outer surface 51 of the theoretical envelope 50 and the working zones of its tooth flanks 5, 6 rest in each contact point tangentially on the workpiece tooth flanks 2, 3. Through a suitable programming, it is moreover also possible to, for example, change the feed angle ε during one operating cycle if this is sensible for the shape of the crown dimension to be produced.

The sequences described above for crowned tooth systems and the machine used therefor can be applied analogously to conical tooth systems.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a method for a precision working of crowned and/or conical tooth flanks on a toothed workpiece comprising a gear-shaped tool having geometrically defined cutting edges or an abrasive surface on its tooth flanks which matingly mesh with the tooth flanks on the workpiece, axes of tool and the workpiece, which axes have a center distance spacing therebetween, being crossed at a crossed-axes angle and carries out thereby a feed movement directed at an angle inclined with respect to the workpiece axis and a plunge-feed movement directed perpendicularly thereto in the sense of a reduction of the center distance, the improvement wherein the feed movement is superposed continuously by an additional movement directed perpendicularly thereto and wherein these two movements are adjusted in such a manner to one another that the working zones of the tool are guided on a curve from one face of the workpiece to the other, and wherein the working zones of the tool are at each contact point in a tangential contact with the workpiece tooth flanks to be produced.

2. The method according to claim 1, including the use of an externally toothed tool for an internally toothed workpiece.

3. The method according to claim 1, including the use of an internally toothed tool for an externally toothed workpiece.

* * * * *